United States Patent
Sarlashkar et al.

(10) Patent No.: US 11,635,343 B2
(45) Date of Patent: Apr. 25, 2023

(54) USE OF FIBER OPTIC STRAIN SENSORS TO MONITOR FASTENER DAMAGE IN STRUCTURES

(71) Applicant: Sikorsky Aircraft Corporation, Stratford, CT (US)

(72) Inventors: Avinash V. Sarlashkar, Pittsford, NY (US); Theodore S. Meyer, Pavilion, NY (US); Matthew P. Harrigan, Horseheads, NY (US)

(73) Assignee: Sikorsky Aircraft Corporation, Stratford, CT (US)

( * ) Notice: Subject to any disclaimer, the term of this patent is extended or adjusted under 35 U.S.C. 154(b) by 190 days.

(21) Appl. No.: 16/647,061

(22) PCT Filed: Sep. 27, 2017

(86) PCT No.: PCT/US2017/053666
§ 371 (c)(1),
(2) Date: Mar. 13, 2020

(87) PCT Pub. No.: WO2019/066800
PCT Pub. Date: Apr. 4, 2019

(65) Prior Publication Data
US 2020/0271542 A1    Aug. 27, 2020

(51) Int. Cl.
*G01M 5/00* (2006.01)
*G01L 1/24* (2006.01)

(52) U.S. Cl.
CPC .......... *G01M 5/0041* (2013.01); *G01L 1/242* (2013.01)

(58) Field of Classification Search
CPC ............................ G01M 5/0041; G01L 1/242
See application file for complete search history.

(56) References Cited

U.S. PATENT DOCUMENTS

| | | | | |
|---|---|---|---|---|
| 4,654,520 | A * | 3/1987 | Griffiths | G01B 11/18 250/227.17 |
| 5,012,679 | A * | 5/1991 | Haefner | G01D 5/35303 73/800 |

(Continued)

FOREIGN PATENT DOCUMENTS

| | | | |
|---|---|---|---|
| EP | 0640824 A1 | 3/1995 | |
| EP | 2213992 A1 * | 8/2010 | B65D 90/48 |

(Continued)

OTHER PUBLICATIONS

EP2213992B1, 2013, English translation, downloaded from the Internet on Nov. 11, 2011 (Year: 2013).*

(Continued)

*Primary Examiner* — Alexander Satanovsky
*Assistant Examiner* — Lyudmila Zaykova-Feldman
(74) *Attorney, Agent, or Firm* — Baker Botts L.L.P.

(57) ABSTRACT

A fastener health monitoring system includes a structure including a first component and a second component, one or more fasteners securing the first component to the second component, and an optical fiber arranged adjacent to the one or more fasteners. The fiber is configured to detect strain on the structure from the one or more fasteners. Strain patterns are derivable from sensed data from the optical fiber, and any deviation in strain value greater than a threshold value at a particular fiber position along the optical fiber is indicative of a missing, damaged, or loosened fastener amongst the one or more of fasteners corresponding to that particular fiber position.

19 Claims, 7 Drawing Sheets

(56) References Cited

U.S. PATENT DOCUMENTS

| | | | | |
|---|---|---|---|---|
| 5,223,675 | A | * | 6/1993 | Taft .................. H02G 3/26 174/164 |
| 5,250,802 | A | * | 10/1993 | Runner ............... G01M 11/086 73/800 |
| 5,293,039 | A | * | 3/1994 | Mongiols ............. G08B 13/10 250/227.14 |
| 5,343,035 | A | * | 8/1994 | Egalon ................ G01L 1/243 385/12 |
| 5,581,019 | A | * | 12/1996 | Minor ................. G01L 1/20 73/114.77 |
| 5,723,857 | A | * | 3/1998 | Underwood ......... G01M 11/085 250/227.14 |
| 6,354,152 | B1 | * | 3/2002 | Herlik ................. G01N 29/223 73/597 |
| 8,683,869 | B2 | | 4/2014 | Herley et al. |
| 9,279,666 | B1 | * | 3/2016 | Balasubramaniam ................ G01B 11/18 |
| 2004/0129868 | A1 | * | 7/2004 | Kilmartin ............. G01B 11/16 250/227.14 |
| 2007/0006653 | A1 | * | 1/2007 | Kim .................. G01N 29/0609 73/594 |
| 2010/0050778 | A1 | * | 3/2010 | Herley ................ G01L 5/246 73/761 |
| 2010/0329602 | A1 | * | 12/2010 | Shah .................. G01L 5/24 385/13 |
| 2011/0135476 | A1 | | 6/2011 | Olesen |
| 2012/0154821 | A1 | * | 6/2012 | Koste ................ G01D 5/35316 356/614 |
| 2012/0321243 | A1 | * | 12/2012 | Younge ............... A61B 5/1076 385/13 |
| 2013/0058616 | A1 | * | 3/2013 | Cote ................. G02B 6/4471 29/428 |
| 2014/0224033 | A1 | * | 8/2014 | Froggatt .............. G01L 1/246 73/800 |
| 2018/0195856 | A1 | * | 7/2018 | Reaves ................ G01L 1/242 |

FOREIGN PATENT DOCUMENTS

| | | |
|---|---|---|
| EP | 2213992 B1 | 4/2013 |
| FR | 2993656 A1 | 1/2014 |
| GB | 2465577 A | 5/2010 |
| GB | 2536962 A | 10/2016 |
| JP | 3586611 B2 * | 11/2004 |
| WO | 9506237 A1 | 3/1995 |

OTHER PUBLICATIONS

EP-2213992-A1, 2013, English translation, downloaded from the Internet on Nov. 11, 2011 (Year: 2013).*

EP-2213992-A1, 2013, English translation, downloaded from the Internet on Nov. 11, 2011 (Year: 2013) (Year: 2013).*

JP-3586611B2, 2004, English translation, downloaded from the Internet on Jul. 27, 2022 (Year: 2004) (Year: 2004).*

Akiyama et al., Strain detection method and strain detection system using optical fiber, 2004, JP3586611B2, downloaded from Espacenet on Dec. 27, 2022 (Year: 2004).*

Extended European Search Report for EP Application No. 17926346. 2, dated Apr. 8, 2021; 8 pages.

* cited by examiner

USE OF FIBER OPTIC STRAIN SENSORS TO MONITOR FASTENER DAMAGE IN STRUCTURES

STATEMENT OF FEDERAL SUPPORT

This invention was made with Government support under Agreement No. W911W6-13-2-0006 for the Army ASTRO-Structures program. The Government has certain rights in the invention.

CROSS REFERENCE TO RELATED APPLICATIONS

This application is a National Stage application of PCT/US17/53666, filed Sep. 27, 2017, which is incorporated by reference in its entirety herein.

BACKGROUND

Detecting, localizing and quantifying airframe structural damage is important to understand current structural capability. Manual inspections are routinely done to check for damage to ensure safety of flight. Airframes include numerous mechanical fasteners which can require significant time to inspect fully. Further, detection of loose, broken and missing fasteners as well as elongated fastener holes, especially in hard to see areas is a challenge, making assessment of fastener health difficult. Additionally, such time consuming procedures reduce the availability of the aircraft. Undetected unhealthy fasteners may also lead to more damage and hence more maintenance time and costs as higher loads are now carried by the fasteners adjacent to the unhealthy fasteners.

BRIEF DESCRIPTION

According to an embodiment, a fastener health monitoring system includes a structure including a first component and a second component, one or more fasteners securing the first component to the second component, and an optical fiber arranged adjacent to the one or more fasteners. The fiber is configured to detect strain on the structure from the one or more fasteners. Strain patterns are derivable from sensed data from the optical fiber, and any deviation in strain value greater than a threshold value at a particular fiber position along the optical fiber is indicative of a missing, damaged, or loosened fastener amongst the one or more of fasteners corresponding to that particular fiber position.

In addition to one or more of the features described above, or as an alternative, in further embodiments the optical fiber is arranged adjacent to a plurality of the fasteners.

In addition to one or more of the features described above, or as an alternative, in further embodiments, an interrogation system is further provided including an interrogator, the interrogator including a light source and a receiver configured to analyze reflected light from the fiber as the sensed data.

In addition to one or more of the features described above, or as an alternative, in further embodiments the interrogation system is disposed with the structure for continuous monitoring of the one or more fasteners.

In addition to one or more of the features described above, or as an alternative, in further embodiments the interrogation system is provided separately from the structure and connectable to the structure when an interrogation is to be made.

In addition to one or more of the features described above, or as an alternative, in further embodiments, the structure is a portion of an aircraft.

In addition to one or more of the features described above, or as an alternative, in further embodiments, the fiber is disposed within a shadow of each fastener in the one or more fasteners, the shadow defining an area surrounding each fastener where strain is detectable from each fastener.

In addition to one or more of the features described above, or as an alternative, in further embodiments, each component includes a fastener hole for each respective fastener in the plurality of fasteners, and the shadow of each fastener extends radially outside of a fastener head of each fastener.

In addition to one or more of the features described above, or as an alternative, in further embodiments, the fiber is disposed within layers of a composite material for one or both of the first and second components.

In addition to one or more of the features described above, or as an alternative, in further embodiments, the structure includes a groove and the fiber is disposed within the groove.

In addition to one or more of the features described above, or as an alternative, in further embodiments, the fiber is adhered within the groove.

In addition to one or more of the features described above, or as an alternative, in further embodiments, the fiber is adhered to a surface of the structure.

In addition to one or more of the features described above, or as an alternative, in further embodiments, the structure further includes a part attached to at least one of the first and second components, the part prohibiting direct visualization of at least one of the one or more fasteners.

According to another embodiment, a method of detecting a missing or malfunctioning fastener in a structure includes arranging an optical fiber along one or more fasteners connecting a first component to a second component of the structure; directing a light down the fiber; receiving reflected light from the fiber; analyzing the reflected light to determine a strain pattern along the fiber; monitoring a strain pattern to detect any deviations in strain greater than a threshold amount; and, interpreting a distance along the fiber having any deviations in strain greater than a threshold amount as a fastener that requires maintenance.

In addition to one or more of the features described above, or as an alternative, in further embodiments, the structure is an aircraft.

In addition to one or more of the features described above, or as an alternative, in further embodiments, arranging the fiber includes arranging the fiber along an area of the aircraft that is not directly accessible by a maintainer.

In addition to one or more of the features described above, or as an alternative, in further embodiments, the method further includes connecting an interrogator to the fiber when light is to be directed down the fiber, the interrogator provided separately from the structure.

In addition to one or more of the features described above, or as an alternative, in further embodiments, directing a light down the fiber includes using an interrogator disposed with the structure.

In addition to one or more of the features described above, or as an alternative, in further embodiments, arranging the fiber along the set of one or more fasteners connecting the first component to the second component includes at least substantially strain-locking the fiber to the structure.

In addition to one or more of the features described above, or as an alternative, in further embodiments, the fiber is disposed within a shadow of each fastener in the one or more fasteners, the shadow defining an area of the structure surrounding each fastener where strain is detectable from each fastener.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
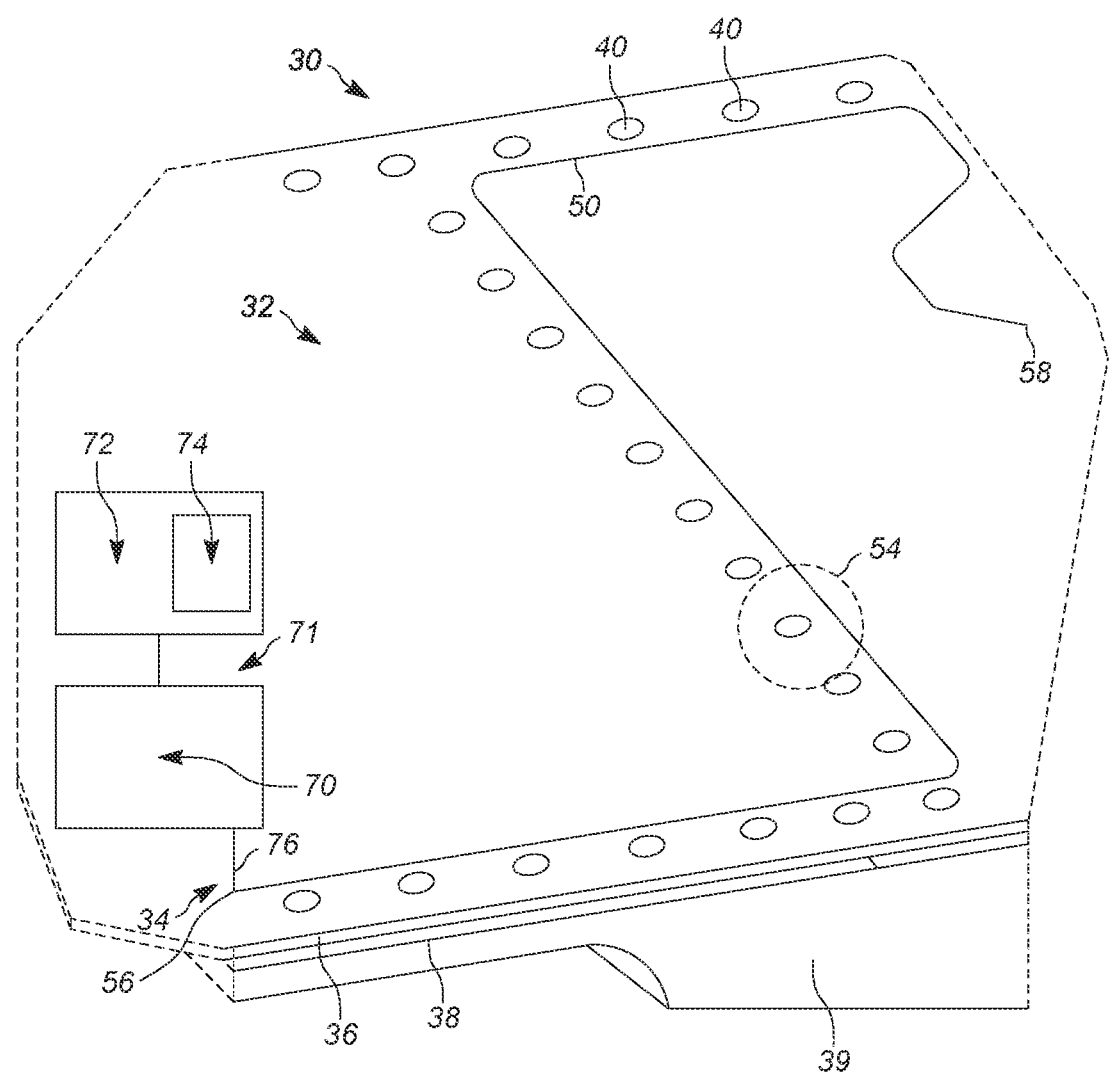
FIG. 1 is a schematic diagram of one embodiment of a fastener health monitoring system.

With reference now to FIG. 1, one embodiment of a fastener heath monitoring system 30 includes a structure 32 and a fiber optic strain sensor assembly 34. The structure 32 includes a first component 36 and a second component 38 that are connected together using one or more fasteners 40. Although for illustrative purposes the fastener 40 is particularly described as passing through the first component 36 and the second component 38, it should be understood that the fastener 40 may additionally pass through more than two components. Also, the term component is used herein to include any feature of the structure 32 through which the fastener 40 passes. In one embodiment, the first component 36 at least partially overlaps the second component 38. The structure 32 may also include additional components that are interconnected directly or indirectly with the first and second components 36, 38. The structure 32 includes one or more fastener holes 42 (FIG. 2) for receiving the respective fasteners 40. The components 36, 38 may include holes 42 that are aligned such that the fastener 40 can pass through two aligned holes 42 for securing the first component 36 to the second component 38. The fasteners 40 may include, but are not limited to, screws, rivets, bolts, pins, etc. and may include in some iterations a head 44 and a shaft 46. The head 44 includes an outer diameter or perimeter that is greater than a diameter of the fastener hole 42. A nut 48 may further be employed on the shaft 46 with the nut 48 abutting the second component 38.

The fiber optic strain sensor assembly 34 includes one or more optical fibers 50. It should be understood that a diameter of the optical fiber 50 may be quite thin relative to the fasteners 40, and may be, but is not limited to, less than 0.010 inch diameter. Each fiber 50 is arranged adjacent one or more of the fastener holes 42. In some embodiments, such as in a large structure 32, the fiber or fibers 50 may be selectively placed along one or more subsets of the fasteners 40 as it may not be necessary to monitor all of the fasteners 40 in the entire structure 32. For example, some fasteners 40 may be easily accessible and monitored and therefore incorporating the fiber 50 may not be necessary. In some embodiments, the incorporation of the fiber 50 may be limited to areas which are inaccessible or inconvenient to access, such as within an area where removal of one or more parts, for example part 39 in FIG. 1, is required before the actual component carrying the fastener 40 is accessed and inspected. In other embodiments, even if all the fasteners 40 are easily accessible, it may still be desirable to incorporate the fiber 50 in areas where continual monitoring is desired, such as areas where the criticality of the health of the fasteners 40 is particularly important.

With additional reference to FIG. 2, the fiber 50 (shown in cross-section) is arranged within a distance D1 from the centerline 52 of each of the fastener holes 42, and within the area from the edge of the fastener hole 42 to the radial distance D1, which is hereinafter referred to as the shadow 54 of the fastener holes 42. As will also be further described below, the term "shadow" herein represents a clamped zone or a zone of influence that the fasteners 40 and their respective loads have on the components 36, 38. One embodiment of a shadow 54 is also illustrated in FIG. 1. The shadow 54 of the fastener holes 42 is the area surrounding the fastener holes 42 where the strain on the structure 32 from the clamping force or preload of the fastener 40 is sufficiently detectable. In addition to the effect of the clamping force or the preload, the shadow 54 will also feel the effects of strain induced by the external loads being carried by the structure. Thus, for best results, the fiber 50 is not placed outside of the shadow 54 where the strain may be dissipated to an extent where it is no longer detectable, or barely detectable. Likewise, the monitored fastener holes 42 and fasteners 40, and their respective shadows 54, are each at a location corresponding to a particular fiber position of the fiber 50. While the shadow 54 may be determined differently depending on the structure 32, types of fasteners 40, and expected loads, one embodiment of a method for placing the fiber 50 within the shadow 54 may include ensuring that the ratio of the distance D1 to the diameter D2 of the fastener hole 42 does not exceed a predetermined factor S, such that the fiber should be placed a maximum distance of D2×S from the centerline 52 of the fastener hole 42. Anywhere further from the centerline 52 would be deemed outside of the shadow 54, while anywhere closer to the centerline 52 would be an acceptable location. In one embodiment, the factor S is between 2 and 3, so that the upper limit of the shadow 54 is not more than 2 to 3 times the diameter D2 of the fastener hole, as beyond that the strain effect may not be sufficiently detectable. While a particular embodiment is described, the factor S may be altered to suit the requirements of a particular configuration. For example, some fasteners 40 may apply more or less load (fastener clamping force, preload, as well as the force being transferred by the fasteners from one component to the other component in response to the externally applied forces and moments) to the structure 32 than others, and/or some structures 32 may have component thicknesses that are different, and these and other variables will affect how much the strain can be detectable from the centerline 52 of the fastener hole 42 and therefore the shadow 54 may be larger or smaller depending on such variables.

The fiber 50 includes a first end 56 and a second end 58 (FIG. 1), and is arranged lengthwise to pass through the shadows 54 of a subset of the fasteners 40 that connect the first and second components 36, 38 together. The subset may include all or just some of the fasteners 40 that connect the first and second components 36, 38 together. At least one fiber 50 is secured to the first and/or second components 36, 38 to at least substantially strain-lock the fiber 50 to the component 36, 38. The fiber 50 is at least substantially strain-locked to the respective component 36 and/or 38 when the fiber 50 is substantially unable to shift or slip relative to the respective component 36 and/or 38. The fiber 50 is capable of measuring strain that is parallel to its length. The strain along the length of the fiber 50 will be produced either because of the lengthwise strain produced due to Poisson's effect, and/or because of in-plane loads carried by the components 36 and 38. While only one fiber 50 is shown in FIG. 1, the structure 32 may include more than one fiber 50. Also, in one embodiment, the fiber 50 may use Rayleigh scattering to make distributed measurements. Such a fiber 50 may be installed adjacent the subset of fasteners 40, with no particular alignment needing to occur other than installation within the shadows 54. Alternatively, a fiber with Bragg gratings may be utilized, however the Bragg gratings would first have to be made to align with the intended arrangement of fasteners 40 in the subset of fasteners 40, the locations of which would have to be determined before the fiber could be created, and then the fiber would have to be installed such that the Bragg gratings align with the respective fasteners 40.

Figure 2:
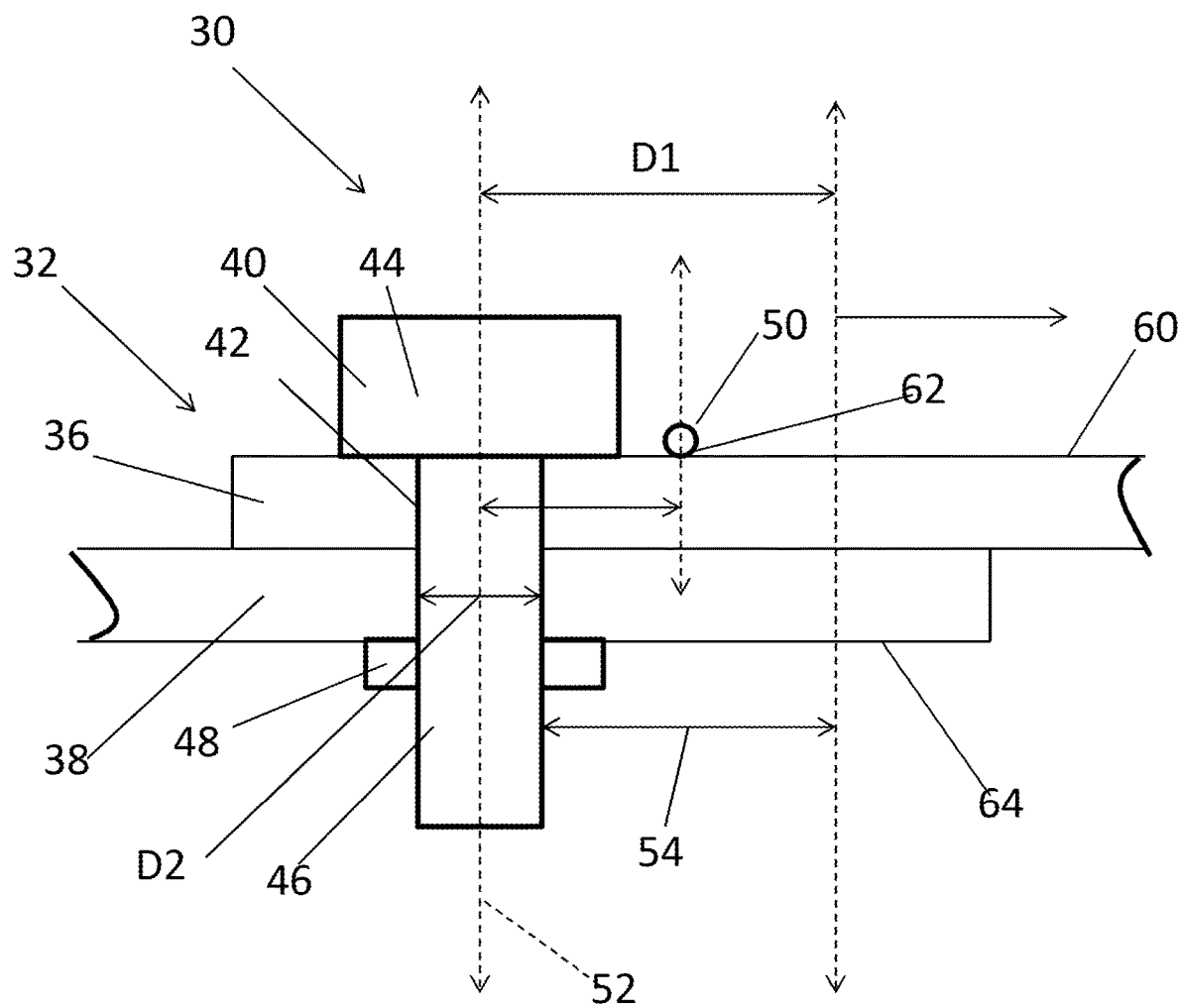
FIG. 2 is a schematic diagram of one embodiment of fiber placement in the fastener health monitoring system.

One embodiment for securing the fiber 50 to the structure 32 is shown in FIG. 2 where the fiber 50 is secured on a surface 60 of the first component 36. In this embodiment, the fiber 50 is secured at an area outside of the footprint of the fastener head 44, but still within the shadow 54. Due to the illustrated surface mount for the fiber 50, the size of the fastener head 44 may dictate how close the fiber 50 can be placed to the fastener hole 42. The fiber 50 may be secured using a mechanical securing element, such as an adhesive 62, such that the fiber 50 is at least substantially immovable across its length. The fiber 50 may alternatively be secured to a surface 64 of the second component 38. Also, for redundancy, the fiber optic strain sensor assembly 34 may include more than one fiber 50 secured to the first component 36 and/or the second component 38. In one embodiment, if two fibers 50 are secured to the first component 36 and adjacent the same subset of fasteners 40, they may be provided at diametrically opposite sides of the fastener holes 42.

Figure 3:
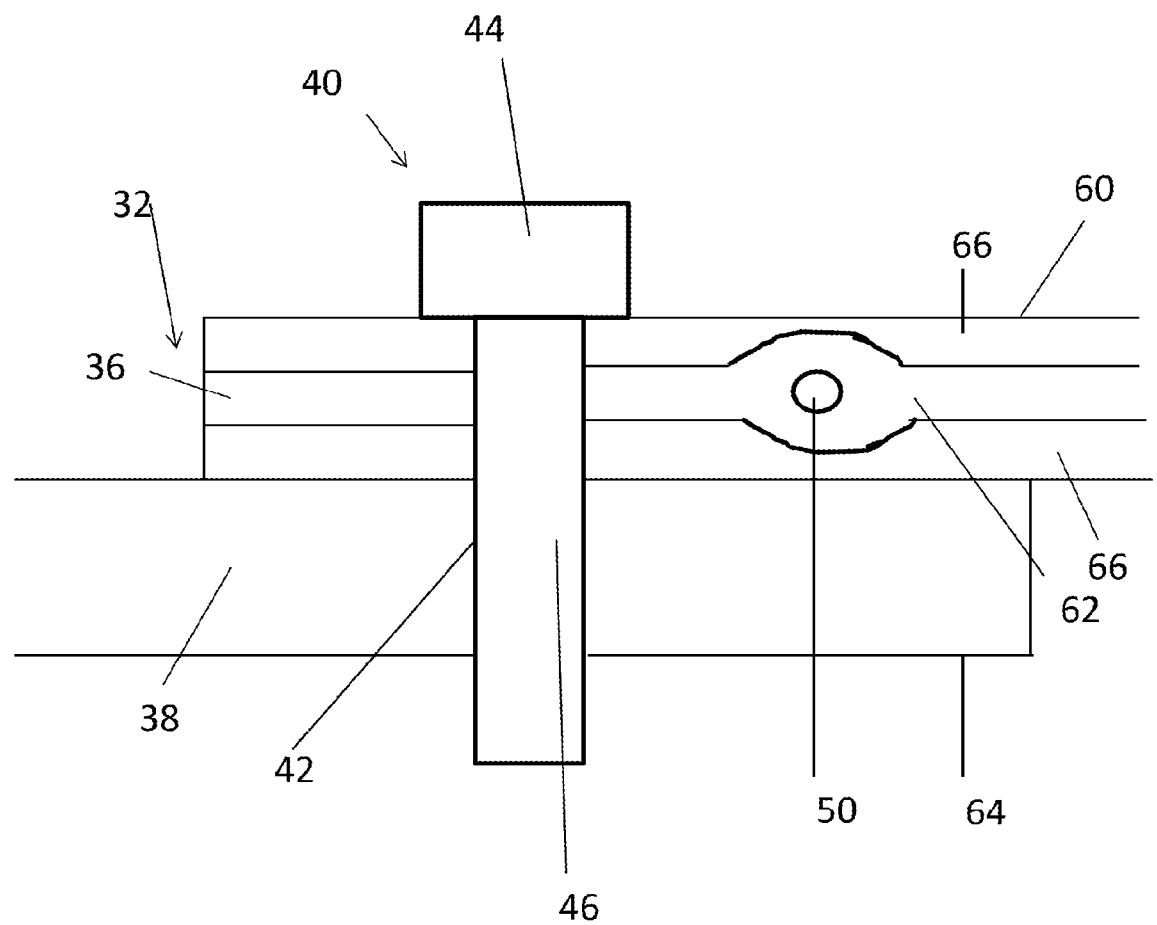
FIG. 3 is a schematic diagram of another embodiment of fiber placement in the fastener health monitoring system.

Another embodiment for securing the fiber 50 to the structure 32 is shown in FIG. 3. In this embodiment, the fiber 50 is embedded between layers 66 of a composite structure 32. In this embodiment, the fiber 50 is protected within the structure 32 during use, however care must be taken to ensure that the fiber 50 is not damaged while forming the fastener holes 42.

Figure 4:
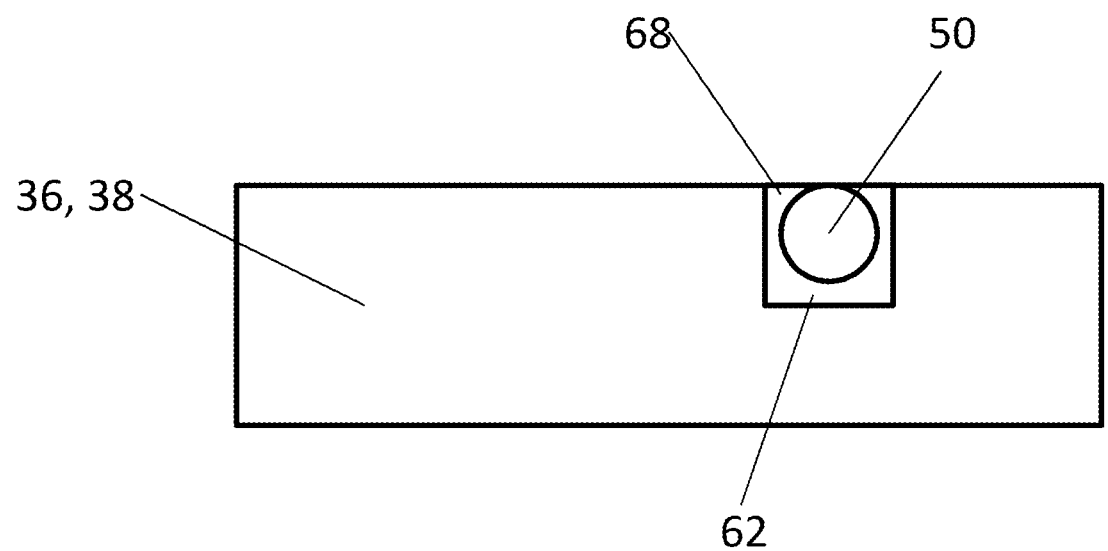
FIG. 4 is a schematic diagram of still another embodiment of fiber placement in the fastener health monitoring system.

Yet another embodiment for securing the fiber 50 to the structure 32 is shown in FIG. 4. In this embodiment, the first and/or the second component 36, 38 is scored or otherwise provided with a fiber-receiving groove 68 for receiving the fiber 50. The groove 68 can be filled with an adhesive 62 to secure the fiber 50 therein and to at least substantially strain-lock the fiber 50 to the component 36, 38. The groove 68 can be placed anywhere within the shadow 54 of each fastener hole 42. This embodiment may better protect the fiber 50 from possible damage than the surface mount shown in FIG. 2, and could potentially be installed on existing structures, unlike the fiber-embedded composite structure shown in FIG. 3, if it is determined that the scored groove 68 would not lead to stress concentrations that would affect structural robustness.

With reference again to FIG. 1, the fiber optic strain sensor assembly 34 further includes an interrogation system 71 including an interrogator 70. The interrogator 70 includes a light source that provides light to the fiber, sending the light down the fiber 50. The interrogator 70 further receives any reflected light, and analyzes and interprets the characteristics of the reflected light in terms of strain at multiple locations along the length of the fiber 50. High spatial density of strain measurements are available with the fiber optic strain sensor assembly 34 which allows strain patterns to be captured at the fasteners 40. The interrogator 70 can analyze the reflections and determine if each little segment of the fiber 50 is being stretched or compressed. Each fastener 40 corresponds to a particular position along the fiber 50, and therefore the strain values at these fiber positions are indicative of material strain values caused by the load supported by the corresponding fasteners 40. By examining changes in the normal strain amplitudes under load and/or changes in the residual strain levels, it is possible to identify faults within the subset of fasteners 40 as well as track any damage progression over time. The fiber optic strain sensor assembly 34 may further include a controller 72, which may additionally include a monitor 74 for providing a visualization of the results, such as, but not limited to, the detected strain pattern within the interrogation system 71.

Analysis of the strain pattern may further include a compensation for temperature, in order to separate the temperature effects from the mechanically induced strain effects. In some areas of a structure 32, the strain effect from temperature will affect a majority of the fiber 50, and therefore the temperature gradients may be the same or substantially the same across the fiber 50. However, if a structure 32 is exposed to heat, such as engine heat or the sun, then some areas of the structure 32 may be hotter than other areas and temperature effects will have to be compensated for. Optical fiber which is free from mechanically induced strain/stresses can be used as a temperature sensor. Thermocouples or a reference optical fiber not bonded to the structure will respond to the temperature and not the mechanical strain and hence may be additionally included within the fiber optic strain sensor assembly 34 to correct for temperature.

Figure 5A:
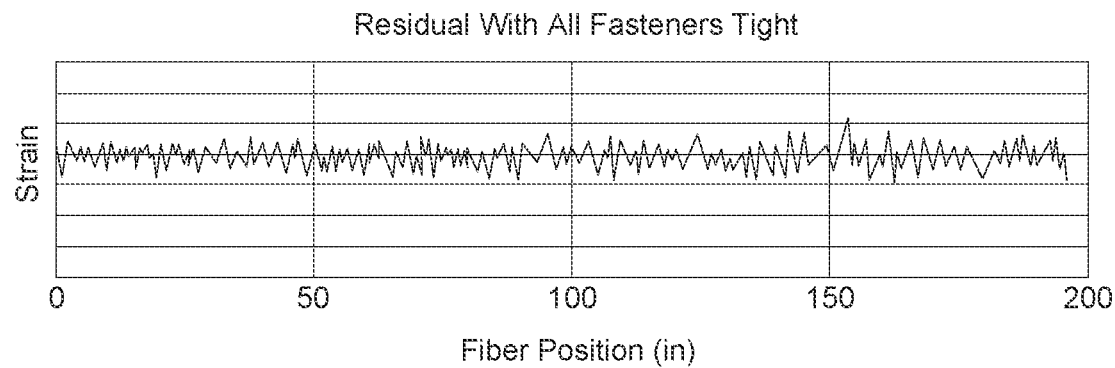
FIG. 5A is a strain pattern depicting strain in a subset of fasteners with all fasteners properly secured.
Figure 5B:
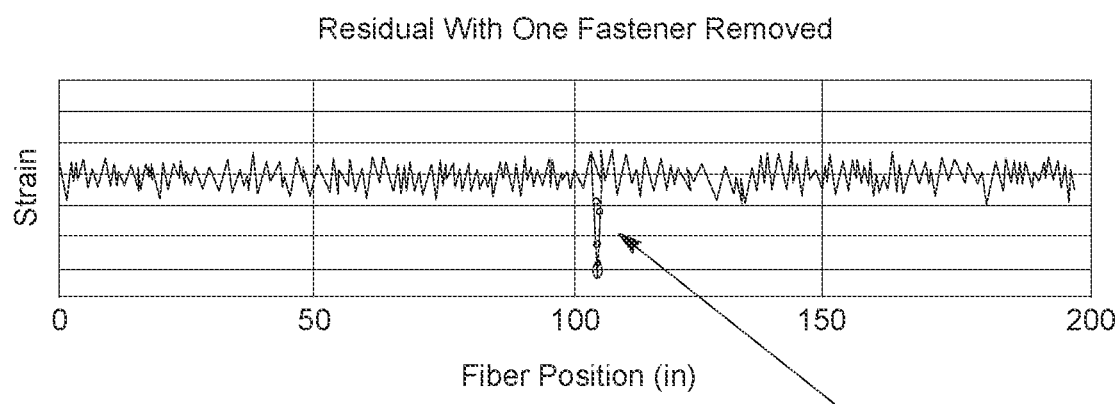
FIG. 5B is a strain pattern indicative of one fastener missing, broken, or loose.

The fastener 40 preloads the structure 32 to squeeze the first and second components 36, 38 together. The applied load produces a strain in the shadow 54 of the fasteners 40 and the fiber 50 measures the strain. As shown in FIG. 5A, when all of the fasteners 40 have a healthy condition, consistent strain is detected in the shadows 54 of each of the fasteners 40. A baseline strain pattern may be stored for comparing with future strain patterns. In the illustrated embodiment, the strain pattern is displayed as function of distance along the fiber 50. According to a method of detecting faulty or missing fasteners 40, and with reference to FIG. 5B, deviation of strain relative to baseline, greater than a threshold value, at a fiber position associated with a particular fastener 40 will indicate a missing, loosened, or broken fastener 40 that needs to be checked and potentially replaced or repaired. The strain pattern can be displayed for an operator's review, or alternatively the data can be sent to the controller 72 and any strains that deviate more than a threshold amount from the baseline can be signaled to the operator for manual inspection and potential repair. If the structure 32 is under load in addition to the clamping force applied by the fasteners 40 themselves, then the fasteners 40 that neighbor a missing, broken, or loosened fastener may show a higher strain (as compared to if all the fasteners 40 were properly installed) because the neighboring fasteners 40 will need to carry more load because of the lack or diminished load carried by the missing, broken, or loosened fastener 40. Thus, during use of the structure 32, the strain in the vicinity of the fastener hole 42 may include the effect of both the clamping preload from the fastener 40 as well as the load applied to the structure 32, and the fiber 50 will sense the total strain. However, if the fastener 40 is missing, loosened, or damaged, there will be a detectable change to the strain that is sensed by the fiber 50 because local load transfer is altered.

Embodiments of the fiber 50 in the fiber optic strain sensor assembly 34 may take hundreds of strain measurements per meter of the fiber 50, with only a single required connection 76 (FIG. 1) at the first end 56 of the fiber 50. So the fiber optic strain sensor assembly 34 provides both high spatial resolution as well as very limited necessary connections. Reduced connections will have the benefit of reducing overall weight and complexity, as compared to providing individual connecting wires to individual strain gauges at each fastener 40 which would only provide data regarding the localized area.

Figure 6:
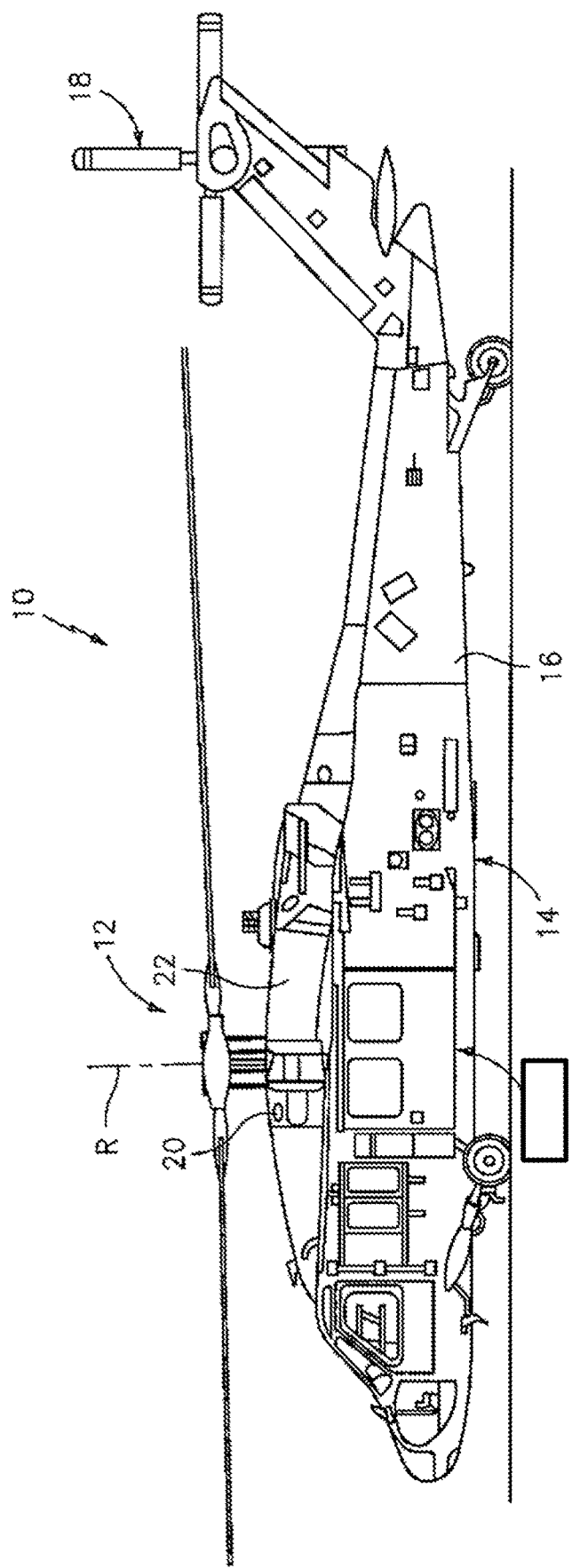
FIG. 6 is an embodiment of a vehicle that can include the fiber optic strain sensing system; and, FIG. 7 is a schematic diagram depicting an alternate embodiment of portions of the fiber optic strain sensing system.

While different structures 32 may incorporate the fastener health monitoring system 30, the fastener health monitoring system 30 is particularly useful when the structure 32 is a portion of a vehicle, and in particular an aircraft. Design of airframes may be such that certain areas are difficult to access, and aircraft can undergo large stresses and strains, must withstand pressurization, de-pressurization, and G-Forces (loads from extreme maneuvers), and may hold large and variable cargo loads, making the monitoring of fastener health particularly important. FIG. 6 discloses one embodiment of a rotary-wing aircraft 10 that may incorporate the fastener health monitoring system 30. The aircraft 10 includes a main rotor system 12 including a multiple of rotor blades mounted to a rotor hub, and an airframe 14 having an extending tail 16 which mounts a tail rotor system 18, such as an anti-torque system. The main rotor assembly 12 is driven about an axis of rotation R through a main gearbox (illustrated schematically at 20) by one or more engines 22. Although a particular helicopter configuration is illustrated and described in the disclosed embodiment, other configurations of aircraft and/or other structures 32 will also benefit from the present invention.

Figure 7:
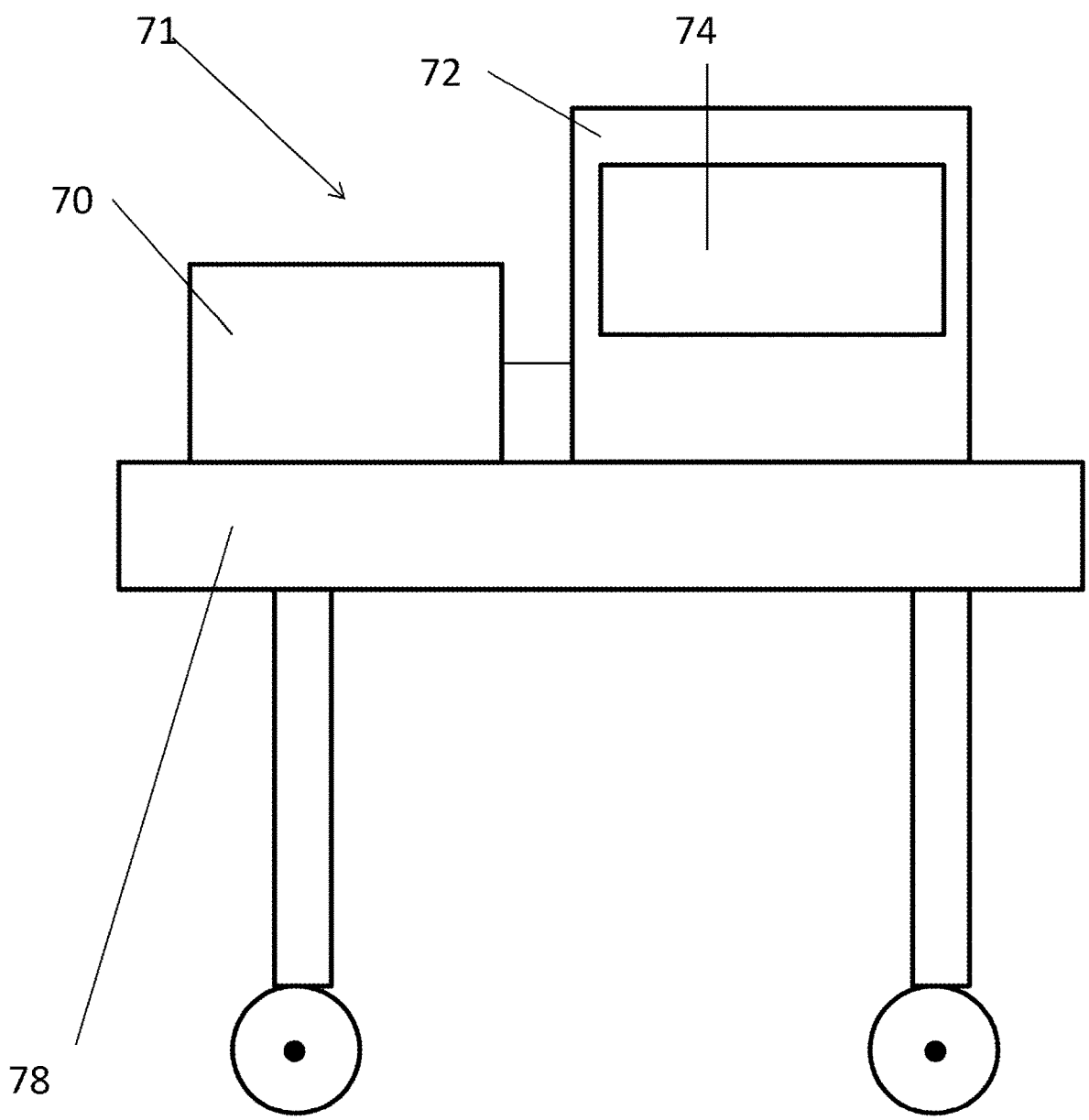

In some embodiments where weight of the fastener health monitoring system 30 is a concern, such as in some embodiments of the aircraft 10, and if continuous monitoring of the fastener health is not necessary, the structure 32 may include the fiber 50 of the fiber optic strain sensor assembly 34, but the interrogator 70, controller 72, and monitor 74 of the interrogation system 71 may be provided separately from the structure 32 and then connected to the fiber when an interrogation is to be made. The fiber 50 itself is very light and does not add significant weight to the structure 32 by having it on board at all times. FIG. 7 shows one embodiment of a disconnected interrogator 70 that is part of the fiber optic strain sensor assembly 34 of the fastener health monitoring system 30. In one embodiment, if the interrogator 70 is large and heavy, portability may be improved by providing it, as well as the controller 72 and monitor 74, on a rolling cart 78. In a method of monitoring for fastener damage, the interrogator 70, controller 72, and monitor 74 of the interrogation system 71 may be wheeled or otherwise moved toward the structure 32, such as the aircraft 10, when the interrogation is to be made, such as when the aircraft 10 has landed. The connection 76 can be made between the interrogator 70 and the fiber 50 so that the interrogation can commence. The interrogator 70 can subsequently be disconnected from the fiber 50 after the interrogation is complete, while the fiber 50 remains secured to the structure 32.

If continuous monitoring of the fasteners 40 is desired, such as, but not limited to in-flight measurements, then the interrogator 70, controller 72, and monitor 74 may be attached to the structure 32 such as on the airframe 14 or otherwise on board and in connection with the fiber 50, and carried with the structure 32. In such an embodiment, in-flight responses could be recorded but the pilot may or may not be informed of changes in the strain pattern, depending on the criticality of the fasteners 40 or the number of fasteners 40 experiencing a strain disparity from the baseline. Data could be examined and the fasteners 40 dealt with when landed. Alternatively, although reducing the workload on the pilot is desirable, in some embodiments an algorithm could determine if there is a certain strain pattern that is deficient at a predetermined number of fasteners 40 which the pilot may need to be aware of during flight. For example, a certain number of faulty fasteners 40 could elicit a warning to the pilot and indicate a need to adjust the maneuvering of the aircraft 10 to avoid loading that area of the aircraft 10, or even indicate a necessity to land depending on the severity of the condition of the fasteners 40.

Autonomously detecting and localizing structural damage with respect to fasteners 40 will reduce scheduled inspections and thereby maintain high levels of availability of the structure 32, and detection of loose, broken and missing fasteners 40 as well as elongated fastener holes 42, especially in hard to see areas will benefit by automated detection methods. The fastener health monitoring system 30 can readily detect and locate loose, broken, and/or missing fasteners 40 without visual inspection and hence can significantly contribute to reducing manual inspection burden and frequency of such inspections. In embodiments where the structure 32 is an aircraft 10, additional benefits may include increasing safety of flight and aircraft availability.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:
1. A fastener health monitoring system comprising:
a structure including a first component and a second component;
one or more fasteners securing the first component to the second component;

an optical fiber arranged adjacent to the one or more fasteners, the optical fiber configured to detect strain on the structure from the one or more fasteners; and an interrogation system including an interrogator, the interrogator including a light source and a receiver configured to:
- analyze reflected light from the optical fiber as sensed data;
- determine a baseline strain pattern comprising strain as a function of distance along the optical fiber when the one or more fasteners are not missing, loosened, or broken;
- after the baseline strain pattern is determined, determine a strain pattern comprising strain as a function of distance along the optical fiber;
- detect, by comparing the strain pattern to the baseline strain pattern, a deviation of the strain pattern relative to the baseline strain pattern that is greater than a threshold value;
- analyze, for a structure with an applied load, local spatial variations of detected strain associated with a plurality of neighboring fasteners;
- associate, based on the detected deviation of the strain pattern and the analysis of local spatial variations, the detected deviation with a fiber position corresponding to a fastener of the one or more fasteners; and
- in response to associating the deviation of the strain pattern with the fiber position corresponding to the fastener of the one or more fasteners, determine that the fastener of the one or more fasteners is missing, loosened, or broken.

2. The fastener health monitoring system of claim 1, wherein the optical fiber is arranged adjacent to a plurality of fasteners.

3. The fastener health monitoring system of claim 1, wherein the interrogation system is disposed with the structure for continuous monitoring of the one or more fasteners.

4. The fastener health monitoring system of claim 1, wherein the interrogation system is provided separately from the structure and connectable to the structure when an interrogation is to be made.

5. The fastener health monitoring system of claim 1, wherein the structure is a portion of an aircraft.

6. The fastener health monitoring system of claim 1, wherein the optical fiber is disposed within layers of a composite material of one or both of the first and second components.

7. The fastener health monitoring system of claim 1, wherein the structure includes a groove and the optical fiber is disposed within the groove.

8. The fastener health monitoring system of claim 7, wherein the optical fiber is adhered within the groove.

9. The fastener health monitoring system of claim 1, wherein the optical fiber is adhered to a surface of the structure.

10. The fastener health monitoring system of claim 1, wherein the structure further includes a part attached to at least one of the first and second components, the part prohibiting direct visualization of at least one of the one or more fasteners.

11. A method of detecting a missing or malfunctioning fastener in a structure, the method comprising:
arranging an optical fiber along one or more fasteners connecting a first component to a second component of the structure, wherein the optical fiber is disposed within a shadow of each fastener of the one or more fasteners, the shadow defining an area surrounding each fastener within a distance from the fastener where strain is detectable from the fastener, wherein the distance is not more than three times a diameter of a fastener hole through which the fastener is inserted to secure the first component to the second component;
directing light down the optical fiber;
receiving reflected light from the optical fiber;
analyzing the reflected light to determine a strain pattern along the optical fiber;
determining a baseline strain pattern comprising strain as a function of distance along the optical fiber when the one or more fasteners are not missing, loosened, or broken;
after the baseline strain pattern is determined, determining a strain pattern comprising strain as a function of distance along the optical fiber;
detecting, by comparing the strain pattern to the baseline strain pattern, a deviation of the strain pattern relative to the baseline strain pattern that is greater than a threshold value and associated with a fiber position corresponding to a fastener of the one or more fasteners;
analyzing, for a structure with an applied load, local spatial variations of detected strain associated with a plurality of neighboring fasteners;
associating, based on the detected deviation of the strain pattern and the analysis of local spatial variations, the detected deviation with a fiber position corresponding to a fastener of the one or more fasteners; and
in response to associating the deviation of the strain pattern with the fiber position corresponding to the fastener of the one or more fasteners, determining that the fastener of the one or more fasteners is missing, loosened, or broken.

12. The method of claim 11, wherein the structure is an aircraft.

13. The method of claim 12, wherein arranging the optical fiber includes arranging the optical fiber along an area of the aircraft that is not directly accessible by a maintainer.

14. The method of claim 11, further comprising connecting an interrogator to the optical fiber when light is to be directed down the optical fiber, the interrogator provided separately from the structure.

15. The method of claim 11, wherein directing a light down the optical fiber includes using an interrogator disposed with the structure.

16. The method of claim 11, wherein arranging the optical fiber along a set of the one or more fasteners connecting the first component to the second component includes at least substantially strain-locking the optical fiber to the structure.

17. The fastener health monitoring system of claim 1, further comprising a thermocouple or a reference optical fiber not responsive to strain on the structure, wherein a correction to local temperature changes is derivable from the thermocouple or the reference optical fiber.

18. The method of claim 11, further comprising correcting for local temperature changes based on information from a thermocouple or a reference optical fiber not responsive to strain on the structure.

19. The fastener health monitoring system of claim 1, wherein the optical fiber is disposed within a shadow of each fastener of the one or more fasteners, the shadow defining an area surrounding each fastener within a distance from the fastener where strain is detectable from the fastener, wherein the distance is not more than three times a diameter of a fastener hole through which the fastener is inserted to secure the first component to the second component.

* * * * *